US012403057B1

(12) United States Patent
Wilson et al.

(10) Patent No.: US 12,403,057 B1
(45) Date of Patent: Sep. 2, 2025

(54) PRONING FACE PACK

(71) Applicant: Turn Medical, LLC, San Antonio, TX (US)

(72) Inventors: Kevin S. Wilson, San Antonio, TX (US); Eric W. Barta, Castle Hills, TX (US); Christopher T. Niederkrom, San Antonio, TX (US)

(73) Assignee: Turn Medical, LLC, San Antonio, TX (US)

(*) Notice: Subject to any disclaimer, the term of this patent is extended or adjusted under 35 U.S.C. 154(b) by 469 days.

(21) Appl. No.: 17/723,300

(22) Filed: Apr. 18, 2022

Related U.S. Application Data

(60) Provisional application No. 63/176,188, filed on Apr. 16, 2021.

(51) Int. Cl.

| | |
|---|---|
| ***A61G 13/12*** | (2006.01) |
| ***A61G 5/12*** | (2006.01) |
| ***A61G 7/065*** | (2006.01) |
| ***A61G 7/07*** | (2006.01) |

(52) U.S. Cl.
CPC ............ *A61G 13/121* (2013.01); *A61G 5/12* (2013.01); *A61G 5/121* (2016.11); *A61G 7/065* (2013.01); *A61G 7/07* (2013.01); *A61G 7/072* (2013.01); *A61G 2200/325* (2013.01); *A61G 2203/70* (2013.01)

(58) Field of Classification Search
CPC ........ A61G 13/121; A61G 5/12; A61G 5/121; A61G 7/065; A61G 7/07; A61G 7/072; A61G 2200/325; A61G 2203/70
See application file for complete search history.

(56) References Cited

U.S. PATENT DOCUMENTS

| | | | |
|---|---|---|---|
| 552,672 | A | 1/1896 | Souney |
| 2,462,984 | A | 3/1949 | Maddison |
| 3,302,218 | A | 2/1967 | Stryker |
| 3,681,797 | A | 8/1972 | Messner |
| 4,391,009 | A | 7/1983 | Schild |
| 4,729,598 | A | 3/1988 | Hess |
| 4,947,496 | A | 8/1990 | Connolly |
| 5,249,320 | A | 10/1993 | Moretz |
| 5,412,821 | A | 5/1995 | Wilkinson |
| 5,487,196 | A | 1/1996 | Wilkinson |
| 5,586,346 | A | 12/1996 | Stacy |
| 5,699,570 | A | 12/1997 | Wilkinson et al. |
| 5,787,534 | A | 8/1998 | Hargest et al. |
| 5,794,288 | A | 8/1998 | Soltani |
| 5,870,785 | A | 2/1999 | Hoorens |

(Continued)

FOREIGN PATENT DOCUMENTS

| | | |
|---|---|---|
| DE | 202005007453 U1 | 10/2005 |
| EP | 1987806 | 6/2009 |

(Continued)

OTHER PUBLICATIONS

RotoProne Therapy System Instructions For Use, Dated Apr. 2019 (84 Pages).

(Continued)

*Primary Examiner* — Adam C Ortiz
(74) *Attorney, Agent, or Firm* — Pizarro Allen PC

(57) ABSTRACT

A face support pack for controlling moisture and friction induced skin breakdown that includes a moisture vapor removal layer.

14 Claims, 11 Drawing Sheets

(56) References Cited

U.S. PATENT DOCUMENTS

| | | | | |
|---|---|---|---|---|
| 5,882,349 | A | 3/1999 | Wilkerson et al. | |
| 5,926,884 | A | 7/1999 | Biggie et al. | |
| 6,065,165 | A | 5/2000 | Delk | |
| 6,108,838 | A | 8/2000 | Connolly | |
| 6,212,718 | B1 | 4/2001 | Stolpmann | |
| 6,269,505 | B1 | 8/2001 | Wilkinson | |
| 6,282,736 | B1 | 9/2001 | Hand | |
| 6,367,106 | B1 | 4/2002 | Gronsman | |
| 6,487,739 | B1 | 12/2002 | Harker | |
| 6,499,160 | B2 | 12/2002 | Hand | |
| 6,526,610 | B1 | 3/2003 | Hand | |
| 6,566,833 | B2 | 5/2003 | Bartlett | |
| 6,609,260 | B2 | 8/2003 | Hand et al. | |
| 6,619,382 | B1 | 9/2003 | Ichigaya | |
| 6,671,905 | B2 | 1/2004 | Bartlett | |
| 6,691,347 | B2 | 2/2004 | Hand | |
| 6,701,553 | B1 | 3/2004 | Hand | |
| 6,701,556 | B2 | 3/2004 | Romano | |
| 6,715,169 | B2 | 4/2004 | Niederkrom | |
| 6,728,983 | B2 | 5/2004 | Bartlett | |
| 6,764,502 | B2 | 7/2004 | Bieberich | |
| 6,817,363 | B2 | 11/2004 | Biondo | |
| 6,862,759 | B2 | 3/2005 | Hand et al. | |
| 6,862,761 | B2 | 3/2005 | Hand | |
| 6,874,181 | B1 | 4/2005 | Vijayendran | |
| 6,912,748 | B2 * | 7/2005 | VanSickle | A47C 27/081 5/655.9 |
| 6,934,986 | B2 | 8/2005 | Krywiczanin | |
| 7,017,211 | B2 | 3/2006 | Krywiczanin | |
| 7,137,160 | B2 | 11/2006 | Hand | |
| 7,191,480 | B2 | 3/2007 | Romano | |
| 7,191,482 | B2 | 3/2007 | Romano | |
| 7,219,379 | B2 | 5/2007 | Krywiczanin | |
| 7,322,059 | B2 | 1/2008 | Hornbach | |
| 7,338,117 | B2 | 3/2008 | Iqbal et al. | |
| 7,455,744 | B2 | 11/2008 | Mileti | |
| 7,469,432 | B2 | 12/2008 | Chambers | |
| 7,469,436 | B2 | 12/2008 | Meyer | |
| 7,472,440 | B2 | 1/2009 | Bartlett | |
| 7,478,869 | B2 | 1/2009 | Lazanja | |
| 7,480,953 | B2 | 1/2009 | Romano | |
| 7,578,552 | B2 | 8/2009 | Bajic | |
| 7,617,555 | B2 | 11/2009 | Romano | |
| 7,712,164 | B2 | 5/2010 | Chambers | |
| 7,914,611 | B2 | 3/2011 | Vrzalik et al. | |
| 7,937,791 | B2 | 5/2011 | Meyer | |
| 7,966,680 | B2 | 6/2011 | Romano | |
| 7,992,239 | B2 | 8/2011 | Hornbach | |
| 8,011,041 | B2 | 9/2011 | Hann | |
| 8,118,920 | B2 | 2/2012 | Vrzalik et al. | |
| 8,181,290 | B2 | 5/2012 | Brykalski et al. | |
| 8,261,387 | B2 | 9/2012 | Lipman et al. | |
| 8,372,182 | B2 | 2/2013 | Vrzalik | |
| 8,601,620 | B2 | 12/2013 | Romano et al. | |
| 8,856,993 | B2 | 10/2014 | Richards et al. | |
| 8,893,338 | B2 | 11/2014 | McCausland | |
| 8,918,930 | B2 | 12/2014 | Stroh | |
| 8,997,287 | B2 | 4/2015 | Lanning et al. | |
| 9,009,892 | B2 | 4/2015 | Lachenbruch | |
| 9,131,780 | B2 | 9/2015 | Lachenbruch et al. | |
| 9,254,231 | B2 | 2/2016 | Vrzalik et al. | |
| 9,433,300 | B2 | 9/2016 | Gibson et al. | |
| 9,462,893 | B2 | 10/2016 | Romano | |
| 9,463,124 | B2 | 10/2016 | Lachenbruch | |
| 9,538,853 | B2 | 1/2017 | Vrzalik | |
| 9,730,847 | B2 | 8/2017 | Lachenbruch | |
| 9,782,311 | B2 | 10/2017 | Lafleche et al. | |
| 9,835,344 | B2 | 12/2017 | Vrzalik | |
| 9,907,408 | B2 | 3/2018 | Vrzalik et al. | |
| 9,913,770 | B2 | 3/2018 | Lachenbruch et al. | |
| 10,172,470 | B1 | 1/2019 | Vrzalik | |
| 10,265,231 | B2 | 4/2019 | O'Reagon | |
| 10,477,975 | B2 | 11/2019 | Tursi, Jr. et al. | |
| 2002/0129449 | A1 * | 9/2002 | Harker | A61G 7/05784 5/423 |
| 2002/0138905 | A1 | 10/2002 | Bartlett | |
| 2002/0138906 | A1 | 10/2002 | Bartlett | |
| 2004/0168253 | A1 | 9/2004 | Hand | |
| 2004/0226091 | A1 | 11/2004 | Hand et al. | |
| 2005/0022308 | A1 | 2/2005 | Totton | |
| 2005/0081300 | A1 | 4/2005 | O Reagan | |
| 2005/0086739 | A1 | 4/2005 | Wu | |
| 2005/0229317 | A1 | 10/2005 | Heiser | |
| 2006/0010608 | A1 | 1/2006 | DeFranks | |
| 2006/0016007 | A1 | 1/2006 | Hornbach | |
| 2006/0112491 | A1 | 6/2006 | Buehner | |
| 2006/0112826 | A1 | 6/2006 | Ichigaya | |
| 2007/0261548 | A1 * | 11/2007 | Vrzalik | A61G 7/05792 95/52 |
| 2008/0028534 | A1 | 2/2008 | Wilkinson | |
| 2009/0056030 | A1 | 3/2009 | Bolden | |
| 2010/0146709 | A1 | 6/2010 | Lafleche | |
| 2010/0274331 | A1 | 10/2010 | Williamson | |
| 2010/0287331 | A1 | 11/2010 | Kuo | |
| 2011/0024076 | A1 | 2/2011 | Lachenbruch | |
| 2011/0308020 | A1 * | 12/2011 | Vrzalik | A47C 21/042 5/724 |
| 2013/0019409 | A1 * | 1/2013 | Blazar | A47G 9/1027 5/644 |
| 2013/0067661 | A1 | 3/2013 | Schwirian et al. | |
| 2013/0074272 | A1 | 3/2013 | Lachenbruch | |
| 2013/0198955 | A1 | 8/2013 | Lishnevsky | |
| 2013/0212808 | A1 | 8/2013 | Lachenbruch et al. | |
| 2013/0298330 | A1 | 11/2013 | Lachenbruch | |
| 2016/0074264 | A1 * | 3/2016 | Davis | A61G 7/072 5/613 |
| 2017/0007482 | A1 | 1/2017 | McKnight | |

FOREIGN PATENT DOCUMENTS

| | | |
|---|---|---|
| EP | 3424478 | 1/2019 |
| WO | 1997018157 | 5/1997 |

OTHER PUBLICATIONS

The University of Toledo Medical Center Guidelines for Use of the RotoProne Bed, Approved for Use Oct. 2009 (7 Pages).

* cited by examiner

PRONING FACE PACK

CROSS-REFERENCE TO RELATED APPLICATIONS

This application claims priority to U.S. Provisional Patent Application No. 63/176,188 titled "Support Packs and Methods of Making the Same" filed Apr. 16, 2021. The full disclosure of the aforementioned patent application is herein fully incorporated by reference FIELD This invention relates to patient face support for prone therapy.

BACKGROUND

There is a need for an improved face support pack useful for controlling moisture and friction-induced skin breakdown during prone therapy.

SUMMARY

A proning head pack comprising a facial interface layer configured to support a patient face, the facial interface layer being liquid vapor permeable but liquid and air impermeable; a boundary layer being air impermeable; and a spacer layer disposed between said interface layer and said boundary layer, the spacer layer configured to air flow therethrough; the facial interface layer and boundary layer each having a perimeter shaped so as to leave exposed one or more face orifices when the facial interface layer is disposed against the patient face, the facial interface layer and boundary layer being joined along the perimeter so as to seal the spacer layer between the facial interface layer and the boundary layer.

A proning head pack configured to leave exposed the eyes, mouth and nose of the patient face when disposed against a patient face, the head pack comprising a moisture vapor removal layer configured for interface with the patient face, the moisture vapor removal layer configured to transmit moisture vapor away from the patient face but not transmit air or liquid; and a support layer.

A proning head pack configured to leave exposed the eyes, mouth and nose of the patient face when disposed against a patient face, the head pack comprising a moisture vapor removal layer configured for interface with the patient face, the moisture vapor removal layer configured to transmit moisture vapor away from the patient face but not transmit air or liquid, the moisture vapor removal layer being further configured to receive fluid pressure from a fluid pressure source so as to provide support to the patient when using the face pack; a vent disposed so as to vent moisture vapor from the moisture vapor removal layer to atmosphere; and a valve configured to pulse open so as to provide cyclical variation of pressure within the moisture vapor removal layer.

A proning head pack comprising a facial interface layer configured to support a patient face, the facial interface layer being liquid vapor permeable but liquid and air impermeable; a boundary layer being air impermeable and substantially impermeable to water vapor; and a spacer layer disposed between said interface layer and said boundary layer, the spacer layer configured to air flow therethrough; wherein said boundary layer includes one or more openings allowing for transport of air out of said boundary layer.

A proning head pack configured to leave exposed the eyes, mouth and nose of the patient face when disposed against a patient face, the head pack comprising a moisture vapor removal layer configured for interface with the patient face, the moisture vapor removal layer configured to transmit moisture vapor away from the patient face but not transmit air or liquid, the layer being further configured to receive fluid pressure from a fluid pressure source so as to provide support to the patient when using the face pack, the moisture vapor removal layer including a facial interface layer, the facial interface layer being liquid vapor permeable but liquid and air impermeable; a boundary layer being air impermeable, the boundary layer including one or more openings to provide for selective communication of moisture vapor from the moisture vapor removal layer to a support layer; and a spacer layer disposed between the interface layer and the boundary layer, the spacer layer configured to air flow therethrough; said support layer being configured to help support the patient even if pressure is lost from the head pack.

DETAILED DESCRIPTION

This disclosure is directed to face support packs for therapeutic beds configured for prone therapy. To provide context for describing the structure and function of various embodiments of face support packs, the disclosure turns first to an overview of an embodiment of a therapeutic bed in which a face support pack may be suitably provided.

Therapeutic Bed

Figure 1:
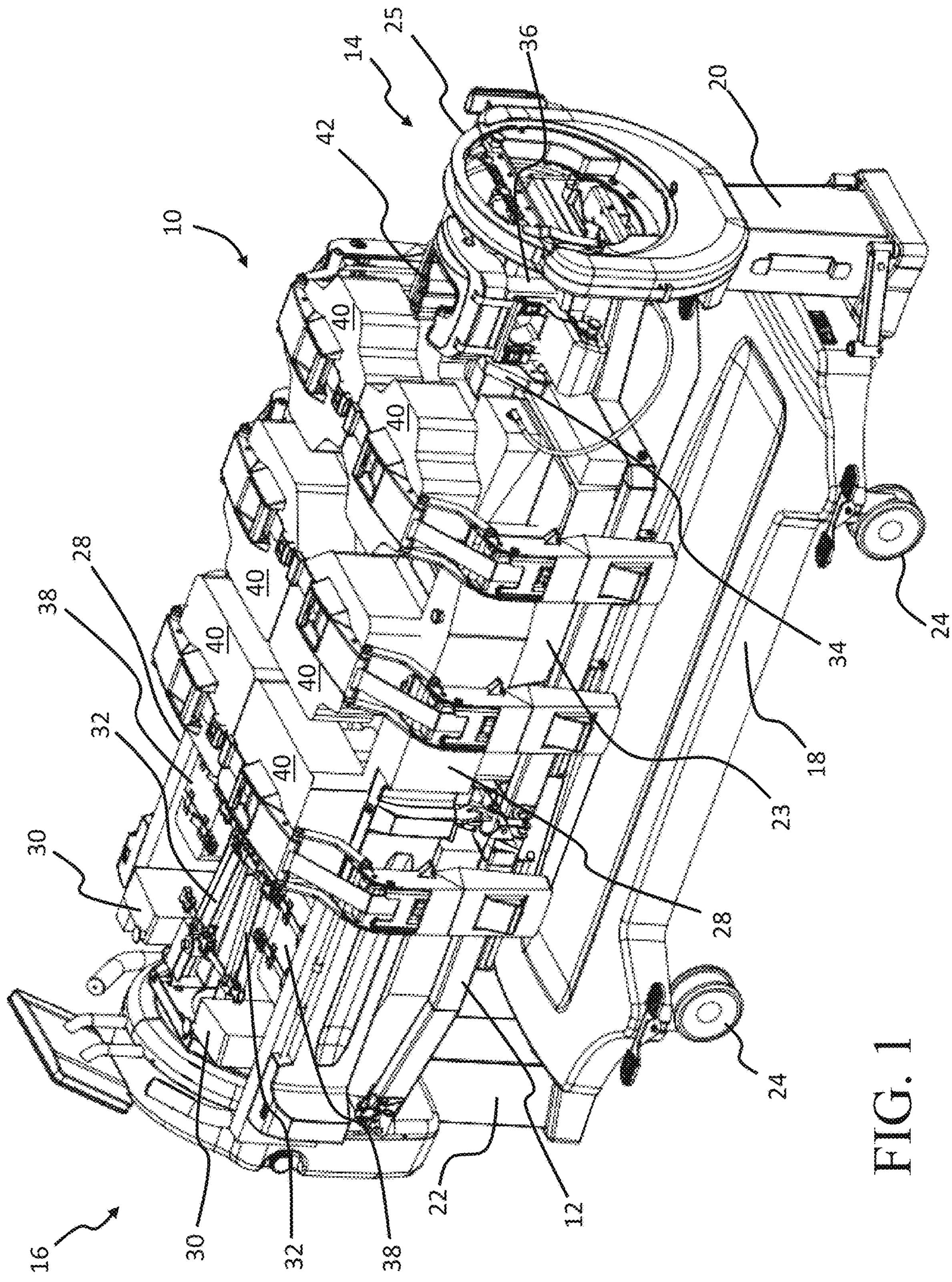
FIG. 1 illustrates an embodiment of a therapeutic bed configured for prone therapy.

FIG. 1 illustrates an embodiment of a therapeutic bed 10 configured to support a patient (not shown) for prone therapy and/or kinetic therapy. Therapeutic bed includes a patient support frame 12 having a head end 14 and a foot end 16. The patient support frame is coupled to a caster frame 18 by a first lift column 20 at the head end and by a second lift column 22 at the foot end. The caster frame may be supported by a plurality of casters 24 for bed mobility.

The therapeutic bed embodiment of FIG. 1 may move a patient through primarily two therapeutic modes of movement: a rotational mode and a tilt mode. To provide a rotational mode of movement, the patient support frame may be rotated about a long axis extending through the foot end and the head end of the patient support frame. The rotational mode of movement permits a patient to be rotated from a supine (face up) orientation to a prone (face down) orientation. The rotational mode of movement may further permit a patient to be oscillated through a range of angular positions in either or both of the supine or prone orientations. The rotational mode of movement may permit 360° rotation or more or less than 360° rotation.

To permit rotational movement, the patient support frame may be rotatably coupled to the lift columns. For example, the foot end of the patient support frame may be coupled to lift column 22 by any suitable means, such as through a plate or saddle (not shown). Other suitable means for providing rotatable coupling between the lift column 22 and patient support frame may be used, such as those described in U.S. Pat. No. 6,862,759, for example, which is herein incorporated by reference. The head end of the patient support frame may comprise a hoop 25, which may be coupled to a lift column 20 using any suitable means. For example, the patient support frame may rest on a roller support coupled to a saddle (not shown) with the saddle coupled to the lift column 20. A drive system (not shown), such as an electrical motor and drive belt, and electronic controls may be used to selectively rotate the patient support frame. Of course, other suitable means for rotatably coupling the patient support frame and lift column 20 may be used. In some modes of operation, the patient support frame may be manually rotated.

To provide a tilt mode of movement, the length of each lift column may be independently adjusted so as to raise and lower the head end of the patient support frame independently of the foot end, or to raise and lower the foot end of the patient support frame independently of the head end. Furthermore, the length of each lift column may be adjusted so as to raise or lower the entire patient support frame with respect to the caster frame. That is, the distance between either or both end of the patient support frame and the caster frame may be adjusted. To permit tilt movement, lift column height may be adjusted by any suitable mechanism, such as by hydraulics, screw, gas spring, coil spring, ratchet or removable pin.

Patient Constraint

When the patient support frame is oriented to support a patient in a supine position, the patient may rest on one or more patient support pads 23 disposed on the patient support frame 12. The one or more support pads 23 may provide a patient support surface 26 to support the patient (not shown in FIG. 1). However, when the patient support frame 12 is moved through one or more modes of movement, the patient must be constrained from sliding or falling from the patient support frame. A variety of packs may be provided to constrain a patient during bed movement.

A plurality of lateral packs may constrain the patient's legs, torso, arms and head from lateral movement with respect to the patient support surface. Such lateral packs may include, for example, side support packs 28, foot packs 30, abductor packs 32, and head packs 36.

A plurality of prone packs may prevent a patient from falling from the bed when the patient is rotated to a prone position. Such prone packs may include, for example, leg packs 38, torso or thigh packs 40 and a face pack 42. Various embodiments of a head pack are described in more detail below.

The term "pack" as used herein refers to a structure that is firm enough to substantially maintain its shape while supporting the patient's body but is also soft so as to comfortably support the patient's body. A pack may, for example, be comprised of a rigid support panel or other structure surrounded by a padding. A pack may be comprised of one or more layers. A pack may comprise a single type of padding. Alternatively, a pack may comprise several different padding materials such as may be used such as to provide a desired level of support in different parts of a pack. For example, a pack may be comprised of materials with more than one spring rate or initial force deflection rating so as to control a level of immersion of the pack around the patient's body. A pack may be shaped to receive a part of the patient's body. For example, a support pack may be generally shaped to contour a patient's legs, forehead, cheeks, or other body part against which it is designed to be disposed. In some embodiments, a pack may be shaped and/or made of materials with controlled properties (e.g., initial force deflection, spring rate, and other properties) so as to reduce any shearing stresses that tend to be formed on the patient's skin when a patient's body is immersed in the pack. A pack may, for example, be filled with a pressurized gas (such as air), foam, a gel, a viscous fluid, or another suitable material.

Patient Access

When the patient support frame is rotated to orient a patient in the prone position, a caregiver may require access to the patient through the patient support frame. The patient support frame may be provided with panels that a caregiver may open to allow access to the patient's body.

Head Support Packs

In view of the foregoing context, a more detailed description of various embodiments of head packs may now be provided. However, the foregoing embodiments of therapeutic beds and various features and functions thereof should not be interpreted as limiting. Any head pack as described herein may be used with any therapeutic bed in which a patient may be positioned or placed in a prone or face down position or in which a patient may be otherwise treated with rotation therapy.

Figure 2:
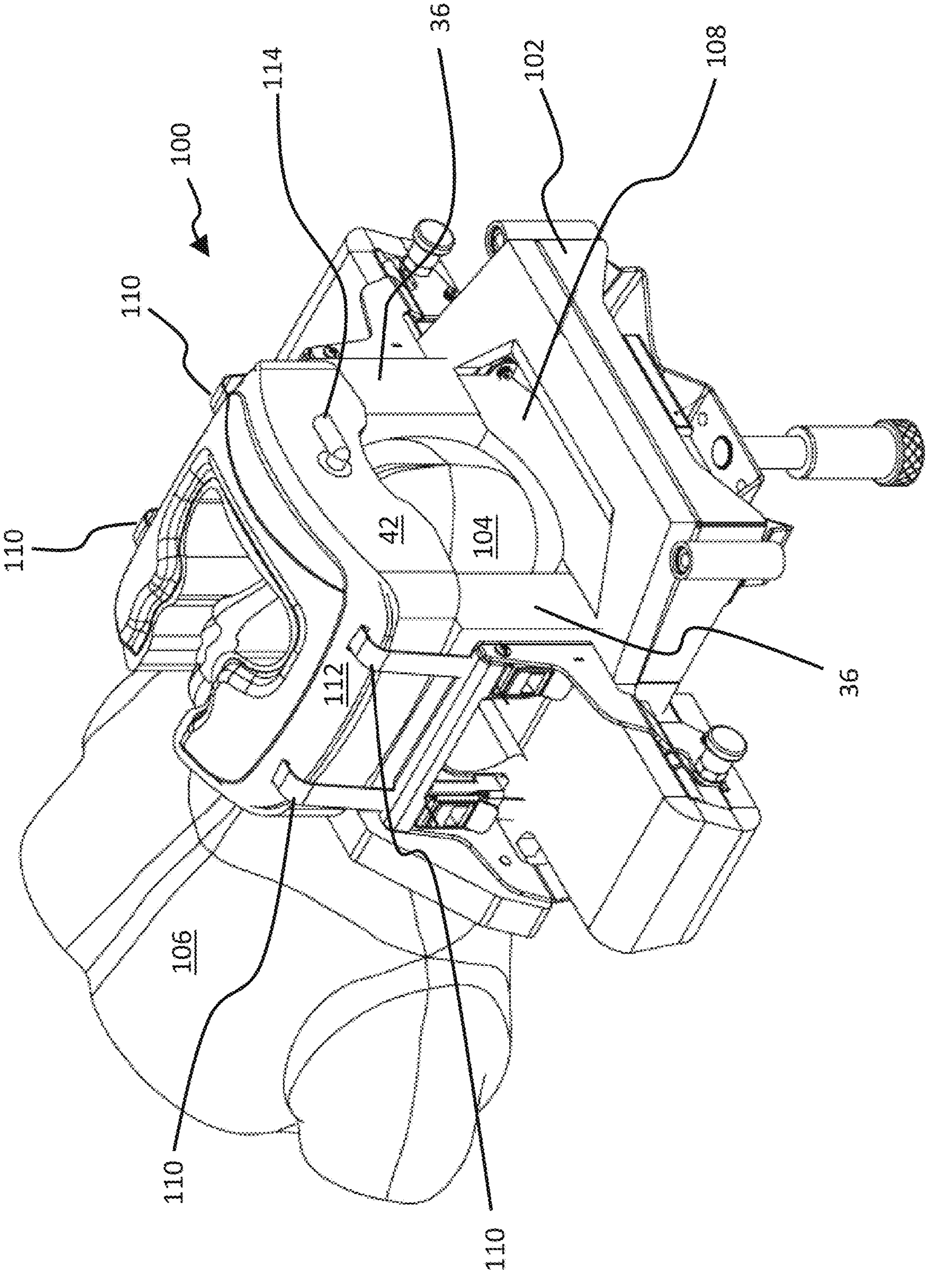
FIG. 2 illustrates an embodiment of a head pack support assembly shown with a patient in a supine or face up position.

As may be seen in the embodiment of FIG. 2, a head pack may designed for supporting the face side or the ear side or posterior of a patient's head. Thus, the head pack may also be referred to as a posterior head pack, a lateral or side head pack, or as a face pack, depending on the portion of the head for which the head pack is configured. As shown in FIG. 2, the face pack 42 may be provided as part of a head pack support assembly 100. The head pack support assembly 100 may comprise a chassis 102 upon which various structures (e.g., securing straps and various packs) may be mounted for releasably constraining the head 104 of a patient 106 during therapeutic treatment of the patient. In the embodiment shown in FIG. 2, chassis 102 may support the face pack 42, one or more lateral head packs 36, and a posterior head pack 108. The face pack 42 may, for example, be releasably coupled to the chassis 102 by a shroud 112 retained by a plurality of straps 110.

Figure 3:
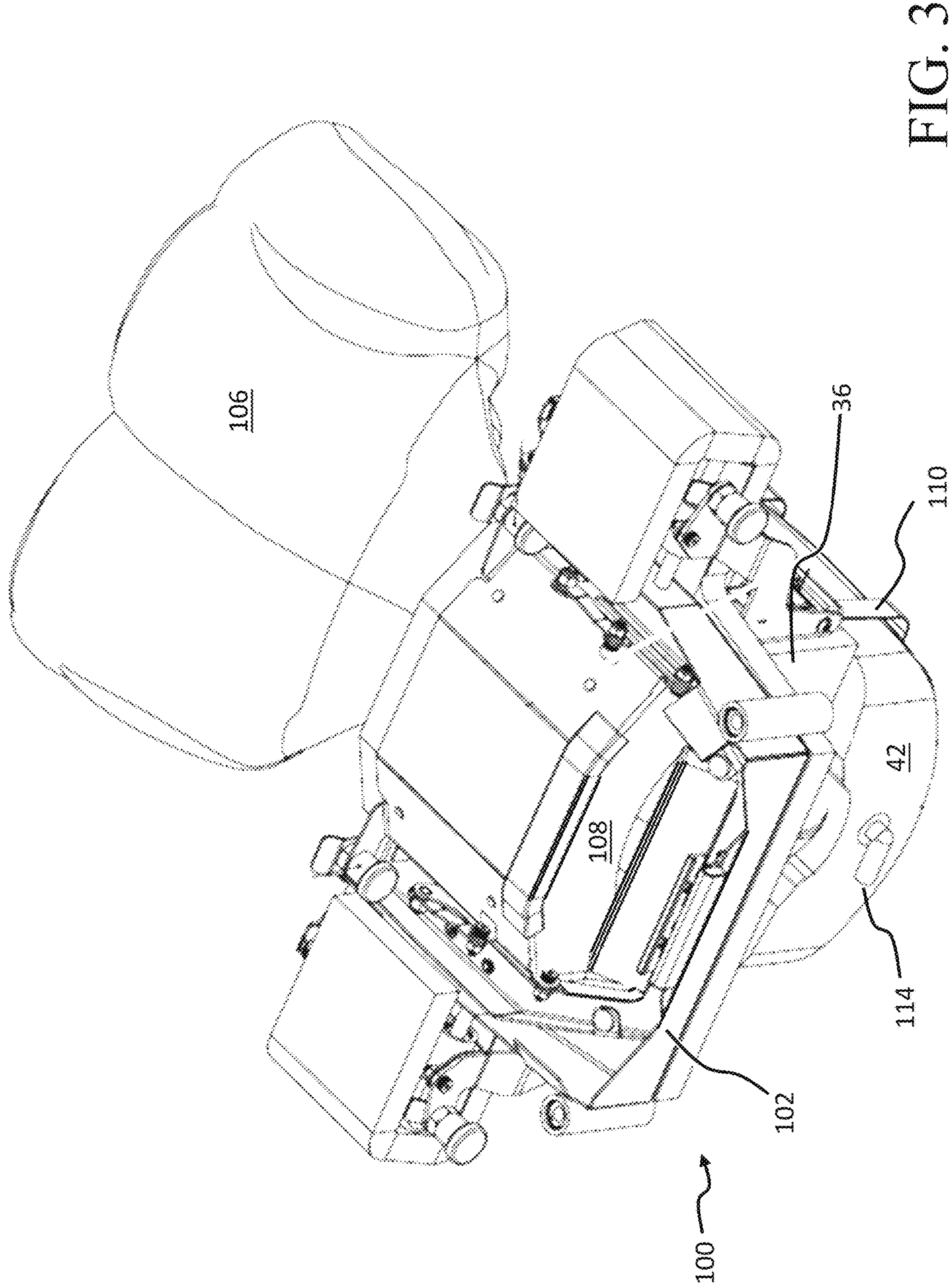
FIG. 3 illustrates a head pack support assembly shown with a patient in a prone or face down position.

The face pack 42 may be shaped to conform to the patient's face while leaving free the patient's eyes, nose and mouth. Thus, when the patient is in a prone position, as may be seen in the embodiment of FIG. 3, the patient may be free to breathe and see through the face pack 42. While novel aspects of MVTR (moisture vapor transmission rate) packs are described in an exemplary manner with respect to the face pack 42, it should be understood some embodiments herein may be applied with other head packs, such as the one or more lateral head packs 36 and posterior head pack 108. Furthermore, in some situations, patients may be oriented on there side during therapeutic treatment. In those situations, a lateral pack may sometimes include car cutouts so that a weight of a patient's head when oriented on a side is supported accordingly without having pressure applied to the patient's ears. The face pack 42 may be shaped conform to the width and height of the patient's face such that the outer dimensions of the face pack 42 approximately fit the patient's face. As may be seen in the embodiment of FIG. 2, the face pack 42 may have a width across the patient's face to extend to the side of the patient's face or just past the ears of the patient so as to permit coupling of the face pack 42 to the chassis 102 by the plurality of straps 110. The face pack 42 may be of sufficient width to permit the face pack to be secured against lateral head packs 36. As may be seen in the embodiment of FIG. 2, the face pack 42 may have a height along the patient's face to extend to or just past the patient's chin and extend to cover the patient's forehead. The face pack may thus have a perimeter shaped so as to leave exposed the eyes, nose and mouth of the patient and to conform to the outer dimensions of the patient's face when the face pack is disposed against the patient face. By configuring the face pack to maximize interface with a patient's face yet leave an opening for the eyes, nose and mouth of the patient, interface pressure may be spread over a larger surface area and thereby reduced.

Figure 4:
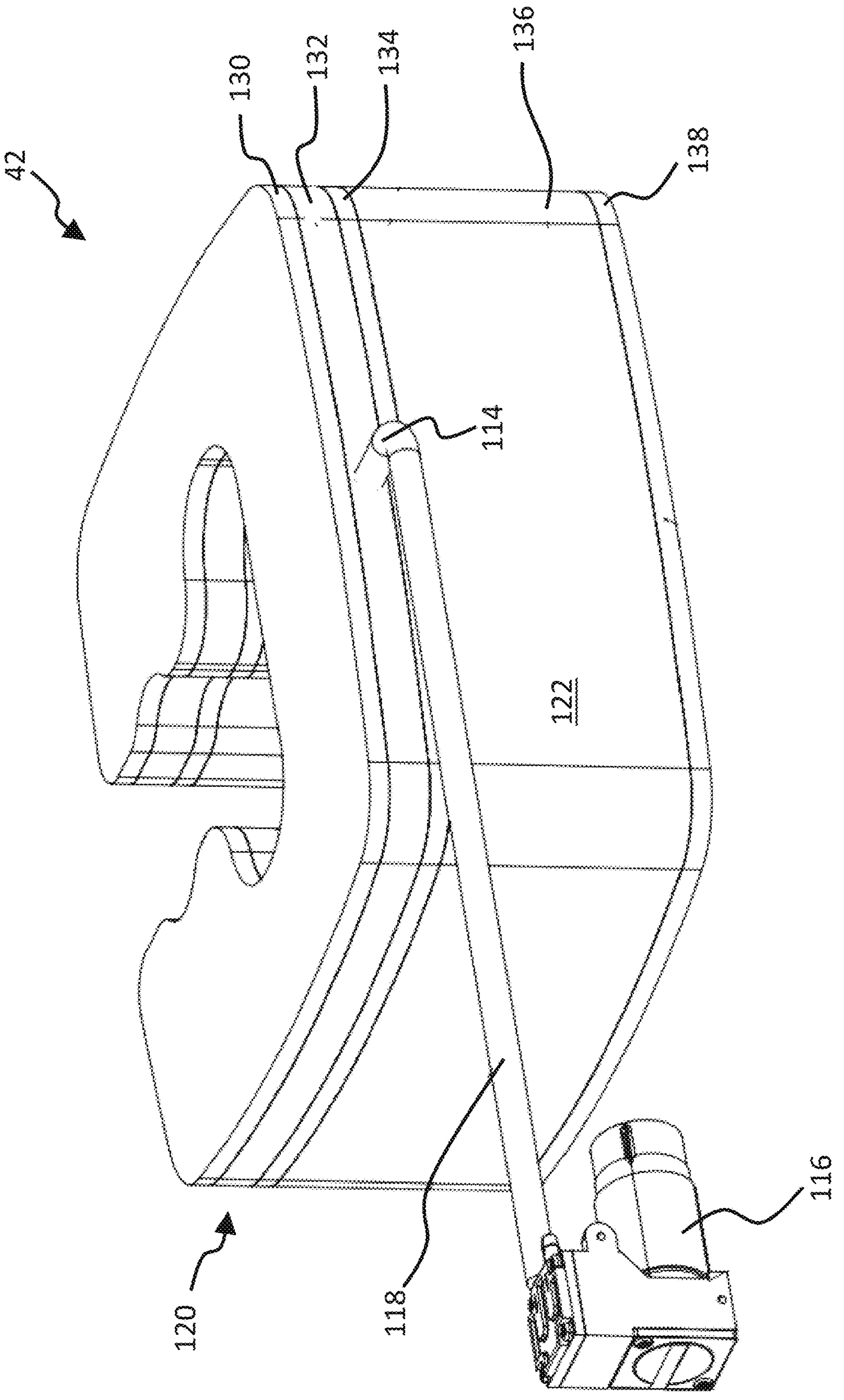
FIG. 4 illustrates an embodiment of a face pack.

As may be seen in FIG. 4, the face pack 42 may comprise a layer 120 configured to transfer moisture vapor away from a patient's face at a rate (such rate generally being referred to as a moisture vapor transfer rate or MVTR) suitable for reducing breakdown of facial skin due to skin-to-pack friction and moisture trapped between the face and head pack (such layer being referred to herein as an MVR layer or a MVTR layer) and a support layer 122. Air may flow into the MVTR layer 120 through an inlet 114 to permit moisture vapor removal through the interface between the patient's face and the face pack. Air may be provided by an air mover 116, such as a blower or pump, and connecting hose 118. Air and moisture vapor may flow out of the face pack 42 to atmosphere through a vent (not shown) or air and moisture or water vapor may be removed by other means.

Moisture Vapor Removal Layer

Figure 5:
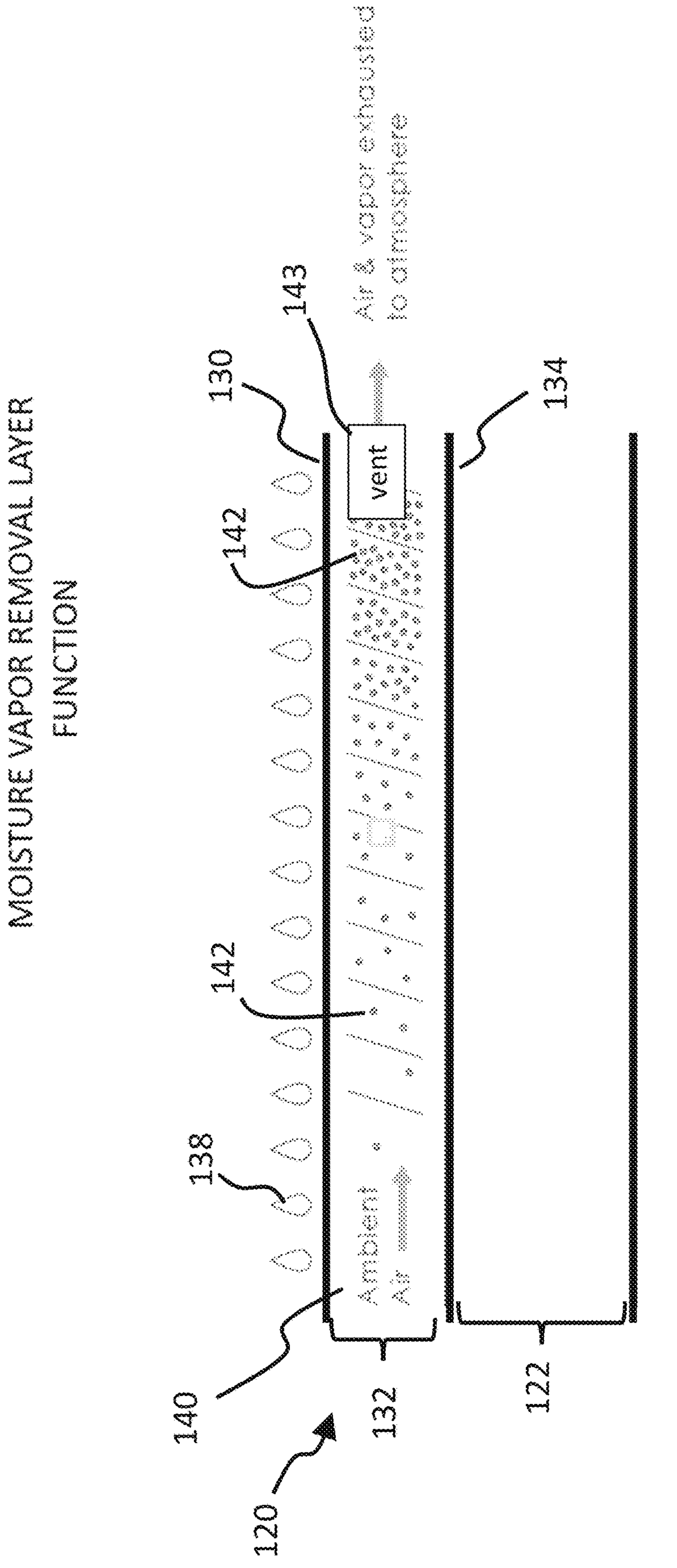
FIG. 5 illustrates moisture vapor removal.

As may be seen in the embodiment of FIG. 5, the MVTR layer 120 may comprise a facial interface layer 130, a spacer layer 132 and a boundary layer 134. The facial interface layer 130 may be permeable to moisture vapor, but substantially impermeable to air and most liquids. The spacer layer 132 comprises an air-permeable material, such as a low-density foam, used to direct air flow as appropriate for routing moisture vapor in a controlled manner away from the patient's face. For example, the spacer layer 132 may route air flow from an inlet to a vent 143 so that moisture-vapor is driven out of the spacer layer 132 through the vent 143. Removal of water vapor 142 from the spacer layer 132 will help to encourage further net transport of moisture across the facial interface layer 130. The boundary layer 134 may be substantially impermeable to air so as to encourage proper air flow for removing moisture from the spacer layer 132. In some embodiments, it may be desirable to route moisture for removal without allowing significant amounts of moisture vapor to infiltrate an underlying support layer 122. In those embodiments, the boundary layer 134 may be substantially impermeable to water vapor. However, in other embodiments, the boundary layer 134 may be permeable to moisture vapor.

In some embodiments, the MVTR layer 120 may operate as shown in FIG. 5. The MVTR layer 120 may be disposed on a support layer 122. A patient's face (not shown) may generate moisture. The facial interface layer 130 may prevent liquid moisture 138 from entering the MVTR layer 120 but will allow moisture vapor 142 to pass into the MVTR layer. Air 140 forced through the MVTR layer 120 will mix with moisture vapor 142 as it passes through the MVTR layer. The air 140 and moisture vapor 142 (i.e., moisture-saturated or vapor enriched air), will exit the MVTR layer 120 and direct moisture away from the patient such as to atmosphere or another moisture sink.

In some embodiments, moisture-saturated or moisture enriched air in the MVTR layer 120 may be exhausted directly into the support layer 122 or pass through the support layer via one or more passages formed therein so that moisture vapor is removed from the spacer layer 132. As opposed to removing moisture vapor through a passage formed in the support layer 122, the support layer may be made with one or more holes or openings formed therein. Moisture vapor 142 may then be actively driven or passively moved through the openings and vented to atmosphere or into another moisture vapor sink.

In some embodiments, the boundary layer 134 will prevent air 140 and moisture vapor 142 from passing through to the support layer 122. This may, for example, be useful in some embodiments wherein a head pack may be re-useable and where it may be undesirable for water to enter the support layer 122. In other embodiments, head packs may be designed for single use. In some of those embodiments, it may not matter that moisture vapor passes into the support layer 122 or transfer of moisture vapor to the support layer may be beneficial. Thus, the MVTR layer 120 may maintain a more constant air pressure than might otherwise be achieved if venting was done more often. This may be particularly beneficial in some embodiments described herein wherein the moisture vapor removal (MVR) layer itself is configured to help support a patient weight.

Figure 6:
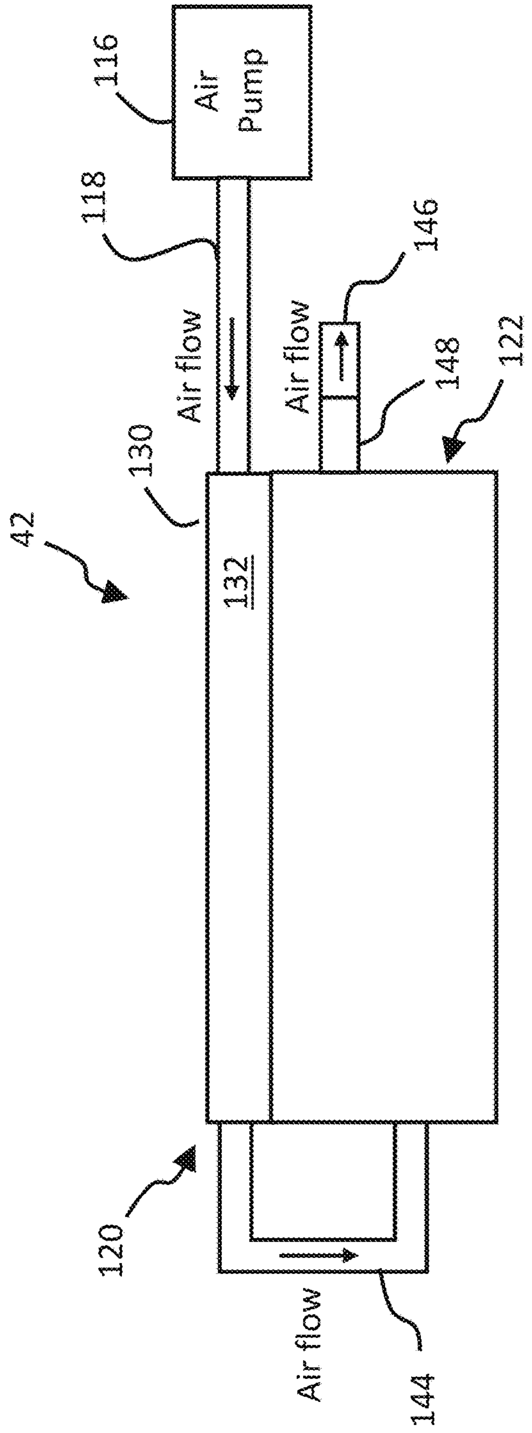
FIG. 6 illustrates another embodiment of a face pack wherein air flow is routed through a support layer.

In some embodiments, such as may be seen in FIG. 6, the support layer 122 may comprise or consist of an inflatable chamber or bladder. The air and moisture vapor may be conveyed to the support layer 122. For example, in the embodiment shown in FIG. 6, the air and moisture vapor may be conveyed from the MVTR layer 120 to the support layer 122 through a fluid conduit 144. A pressure relief valve 146 may be provided at an outlet 148 of the support layer 122 to hold the air until a threshold pressure is reached. When pressure in the support layer 122 reaches the pressure relief threshold, then the pressure relief valve may release the air and moisture vapor to atmosphere. Thus, air forced by the air mover (e.g., a pump as particularly shown in FIG. 6) may both remove moisture vapor from the MVTR layer 120 and pressurize the support layer.

In some embodiments, a flow rate of the pressure relief valve 146 (e.g., a flow rate supported when the valve is open) may be about equal or lesser than that of a flow provided by the air mover 116 (as configured in the system). For example, depending on the resistance to flow of the spacer layer 132 and fluid conduit 144 between the MVTR layer 120 and support layer 122, an air mover or pump 116 may be configured to provide air flow to the support layer 122 at a certain rate. By using a foam in the support layer 122 with light compression force, the patients head will then be supported by the air at the desired pressure.

Figure 12:
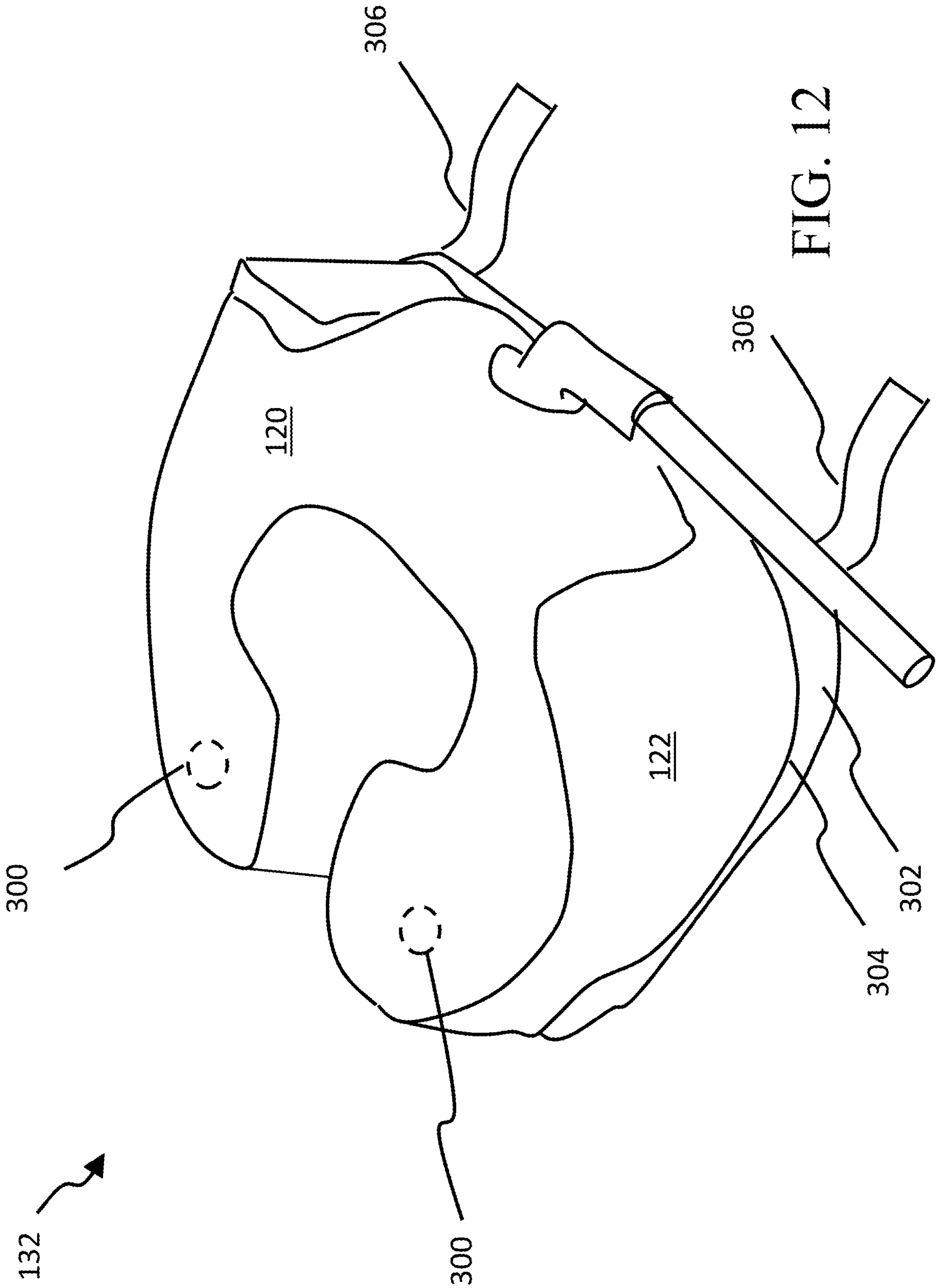
FIG. 12 illustrates still another embodiment of a face pack.

In the embodiment shown in FIG. 6, air flow is directed towards the support layer 122 using a fluid conduit 144. As depicted, the fluid conduit 144 is shown as external tubing (outside of the support layer 122). However, this need not be the case in other embodiments. For example, the fluid conduit 144 may be disposed within the support layer 122. Alternatively, air flow may be provided through one or more holes formed in the boundary layer 134 of the MVTR layer 120. For example, holes may be formed in the boundary layer 134 of the MVTR layer 120 so that moisture may be vented from the spacer 132. For example, FIG. 12 shows an embodiment of a face pack 132 where moisture is removed from the MVTR layer 120 through one or more openings or holes 300 provided therein. The MVTR layer 120 is disposed on top of the support layer 122. The boundary layer 134 of the MVTR layer 120 is generally disposed at the interface between the MVTR layer 120 and the support layer 122. However, one or more holes or openings 300 are formed in the boundary layer 134. The holes 300 may allow air to pass to the underlying support layer 122 for venting. Air may exit from the support layer 122 in any suitable way. For example, in the embodiment shown in FIG. 12, air may exit through seams 304 formed in the support layer 122. A plastic retaining shield 302 may be disposed underneath the support layer 122. Straps 306 may be used to couple the face pack 132 to a head pack support assembly.

The facial interface layer 130 may comprise one or more materials or layers which, individually or in combination, are liquid impermeable but permeable to liquid vapor. For example, the facial interface layer 130 may be comprised of a bonded material or laminate that includes any suitable "skin friendly" fabric on one side and an opposite side that is selectively permeable. A "laminate" as used herein may comprise a material formed with a plurality of layers. Or, the facial interface layer may include two distinct materials that are not bonded together, including a first material that is "skin friendly" fabric and a second material that is selectively permeable. The facial interface layer 130 may comprise a top layer that comprises a material suitable for skin contact, such as a material with low interfacial friction, high elasticity, and suitable hypo-allergenic properties. For example, in some embodiments, a "skin friendly" material or layer may be cotton or other suitable natural cellulose fiber and the second material or layer may be a suitable thermoplastic elastomer, or suitable fluoropolymer, including, by way of nonlimiting example, thermoplastic elastomer, PTFE (polytetrafluoroethylene), or a hydrophilic, polyether-ester block copolymer. The facial interface layer may be sealed along its perimeter to the boundary layer which creates an air-scaled chamber that may be filled by spacer layer.

In some embodiments, the facial interface layer 130 may be made of a suitable moisture vapor permeable, reduced air permeability material. While it may be preferred for the air permeable layer to be fully air impermeable, it could be replaced with any fabric which limits air permeability through the layer. In some of those embodiments, air flow may be increased to offset the effects of the permeability.

The spacer layer 132 may generally comprise any material which allows air to pass through or around its support structure. In some embodiments, a spacer layer 132 may comprise a support material that defines a scaffolding or matrix that allows air to pass in open spaces or interstices defined by the scaffolding or matrix. For example, in some embodiments, the spacer layer 132 may comprise reticulated foam, such as a polyurethane foam, which may be durable and porous.

An air mover may be coupled to the spacer layer 132 through the air hose 118. The air mover may provide positive pressure to force air into the spacer layer 132, or negative pressure to draw air through the spacer layer. In some embodiments, the air mover may comprise a pump or a fan. In some embodiments, a positive or negative displacement air mover could be built directly into the face pack. Air provided by the air mover travels or circulates through the spacer layer, moving adjacent to the facial interface layer.

As the patient perspires, the humidity at the patient/support interface increases. As the humidity increases at the interface layer, moisture is forced away from the patient's face, through the facial interface layer in the form of vapor into the drier air within the spacer layer. This action may continue as long as the air within the spacer layer is dryer than that at the patient interface. In some embodiments, air within the spacer layer may generally have a humidity that is about the same as the ambient environment. Ambient humidity is ideal for maintaining skin integrity. Thus, as long as equilibrium of humidity has not been reached between the spacer and facial interface layer, moisture vapor will be pulled from the facial interface layer to the spacer layer. In other embodiments, air within the spacer layer may be conditioned to a humidity level lower than that of the ambient environment. For example, if the kinetics of flow of vapor through the facial interface layer are slow, the facial interface layer and spacer layer may advantageously be operated under nonequilibrium conditions. To help remove humidity an adsorption desiccant or dryer may be used, for example.

The boundary layer 134 may, in some embodiments, comprise an air impermeable heat transfer vinyl. In such embodiments, heat transfer vinyl may be effectively sealed together with thermoplastic elastomers so that the facial interface layer 130 and boundary layer 134 may be sealed together using heat and pressure, for example. In some embodiments, a tie layer may be applied to either or both of the facial interface layer and boundary layer. A tie layer may be used to promote welding of two materials that otherwise may be difficult to bond.

The MVTR layer 120 may be constructed in a variety of ways. In some embodiments, the facial interface layer 130 may be bonded to the air impermeable boundary layer 134 using a welding process or adhesive process. As used herein the term "welding" encompasses techniques for bonding two or more materials together using direct or indirect application of heat or to a boundary interface between two or more materials. Notably, some highly moisture vapor permeable fabrics may not typically be easily RF or sonically weldable, so some sort of adhesive may be necessary to bond the two layers. A seal tape may be used to seal a vapor permeable fabric to an impermeable layer. However, seal tapes are generally delicate, and use of seal tapes may be time consuming and difficult. Thus, use of a heat transfer vinyl as the impermeable boundary 134 provides certain advantages over other materials.

Figure 7:
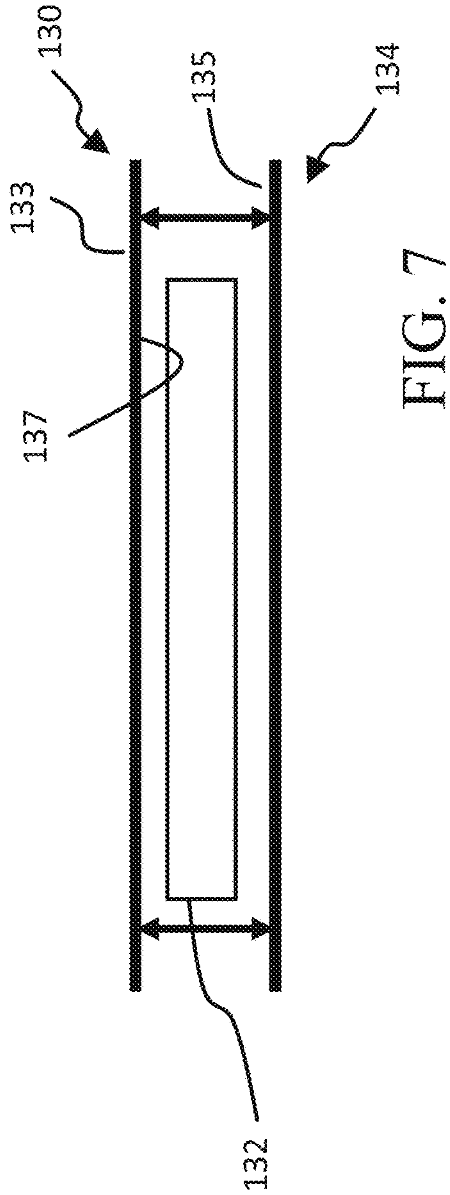
FIG. 7 illustrates assembly of an embodiment of a moisture vapor removal layer.

Thus, in some embodiments, such as may be seen in the embodiment of FIG. 7, to join and seal the MVTR layer a heat press or iron can be used. The facial interface layer 130 can be placed on a press. The facial interface layer 130 may, for example, comprise a skin friendly first side 133. For example, as described above, the first side 133 may be made of a first material that is a "skin friendly" fabric such as cotton or other suitable natural cellulose fiber. In some embodiments, the first side 133 may be made of a synthetic fiber such as spandex or polyester. A second side 137 may be made of a second material such as a hydrophilic polyether-ester block copolymer. The spacer layer 132 may then be disposed against the facial interface layer 130. The impermeable boundary layer 134, may be constructed from heat transfer vinyl and may include a heat sealable side 135. The boundary layer 134 may be cut to a similar shape as the facial interface layer 130, may then be placed in contact with the spacer layer. The spacer layer 132 is cut to a smaller footprint than the facial interface layer and the boundary layer, such that it fits within the profile of the facial interface layer 130 and boundary layer 134 leaving perimeter facial interface layer and boundary layer to be sealed together. The stack of layers may be placed in a heat press. Once heat and/or pressure is applied via a platen, the spacer layer 132 may be pneumatically sealed within the facial interface layer 130 and the boundary layer 134 such as may be used to create a sealed air flow path.

Figure 8:
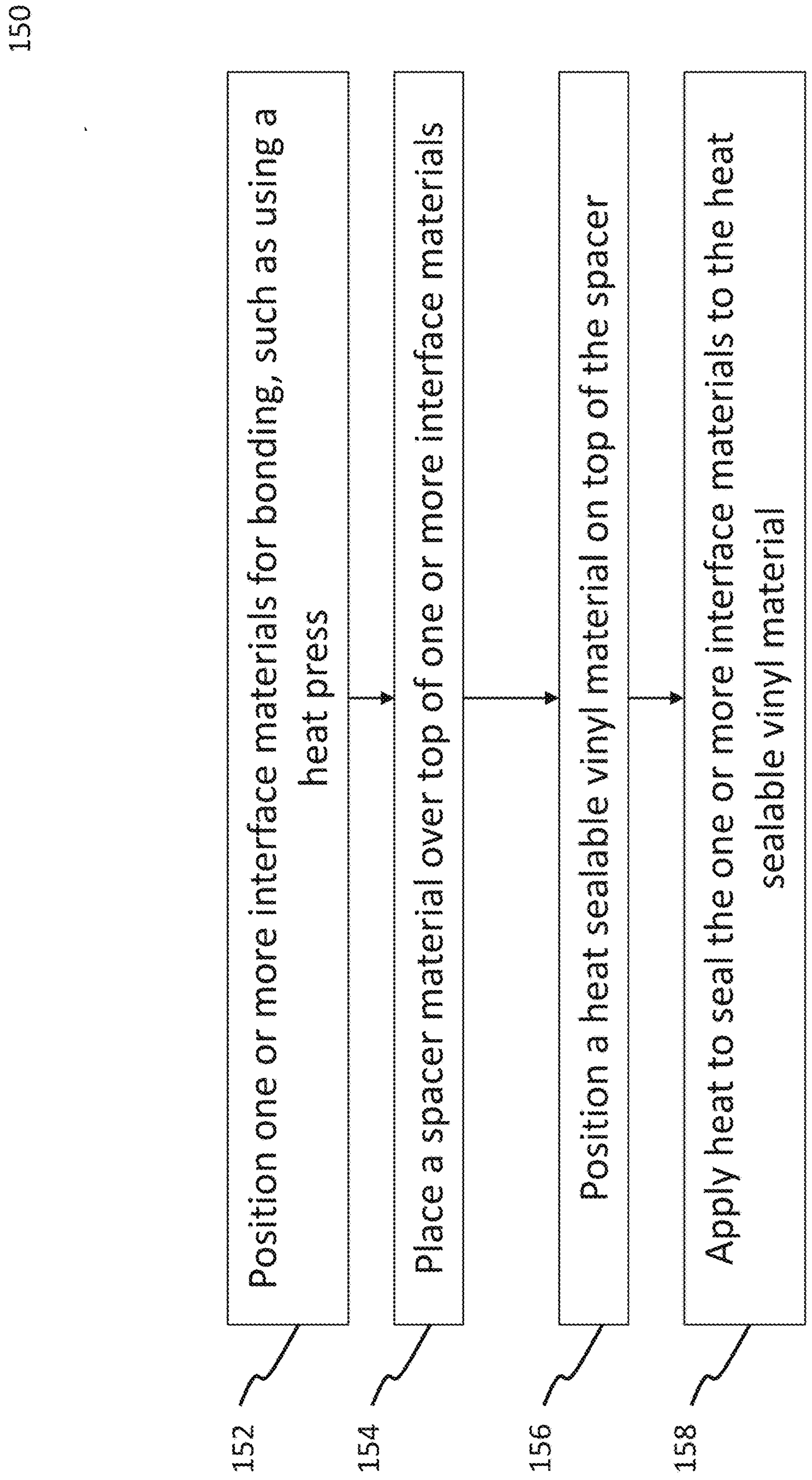
FIG. 8 illustrates a method of assembling an embodiment of a moisture vapor removal layer.

FIG. 8 shows an embodiment of a method 150 for making an MVTR layer 120. As shown in step 152, the one or more facial interface layer materials (e.g., a moisture permeable, air and liquid impermeable laminate) may be placed on a heat press or other suitable machinery used for welding. In step 154, a spacer layer material may be placed over top of the one or more interface materials. The spacer layer material may be cut to a shape that defines a smaller footprint than the laminate. Accordingly, the spacer layer material may fit within the profile of the laminate. In step 156, a boundary layer material (e.g., impermeable heat transfer vinyl) may be positioned on to top of the spacer layer. The boundary layer may, for example, be cut to a suitable shape so that it may be placed over the spacer layer. In a step 158, heat may be applied so as to seal the facial interface layer to the boundary layer. One or more other steps may then be used to integrate the panel into a finished face pack, such as attachment to a support layer.

Support Layer

The support layer 122 may comprise any suitable support structure that tends to conform and distribute the weight of the patient's head across a larger area, such as foam. In some embodiments, the support layer 122 may comprise one or more foam layers having various spring rates or initial force deflection ratings. For example, a plurality of different foams of different density may be used to provide multiple spring rates or initial force deflection ratings. The use of materials with graduated initial force deflection may be used to provide improved contact of the patient's face with the facial support, distributing force so as to reduce localized areas of high pressure on the face, such as bony protuberances. For example, a first layer may be more resistant to deformation than a second layer. This structure may help the support layer 122 deform in a way to reduce localized areas of high pressure on the face. In some embodiments, a support layer 122 having graduated initial force deflections could be replaced with a homogeneous support layer of foam or any suitable flexible material. The support layer 122 may be covered or enclosed by any suitable fabric.

Figure 9:
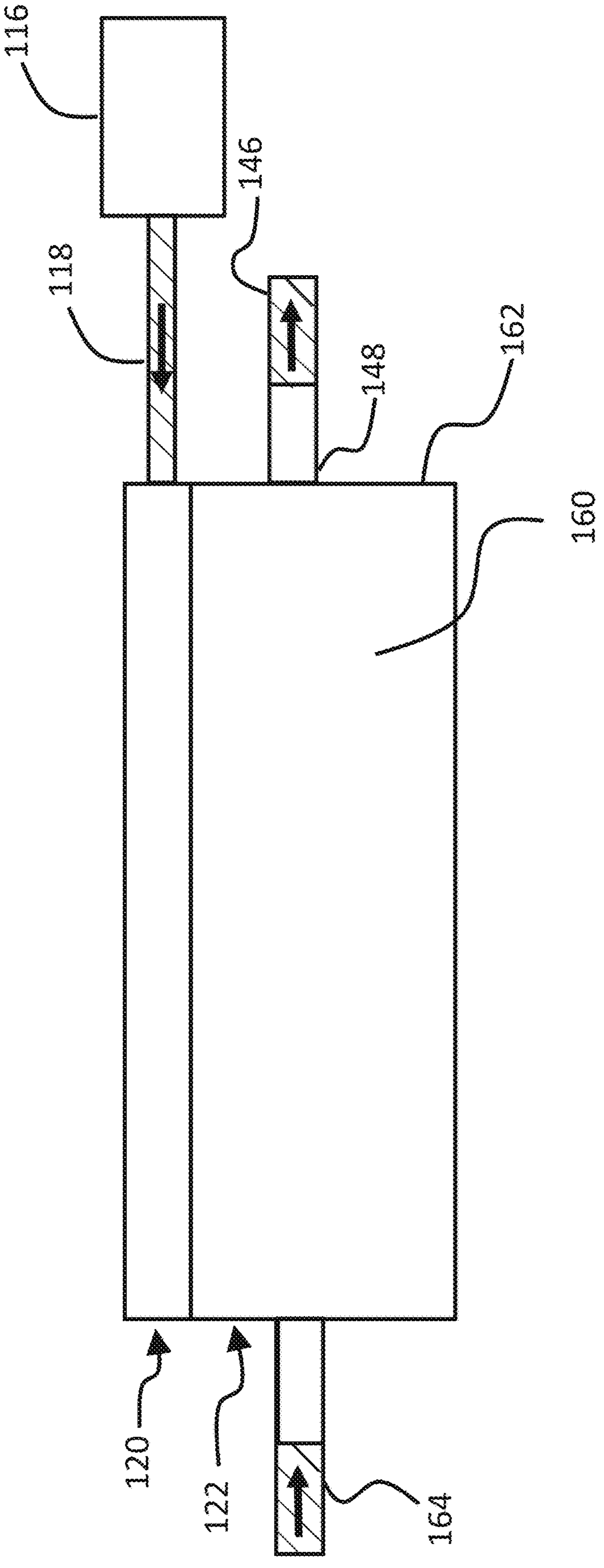
FIG. 9 illustrates another embodiment of a face pack including a check valve.

In other embodiments, the support layer 122 may include a "reforming" foam. For example, in the embodiment of FIG. 9, reforming foam 160 is encased in a sealed cover 162, which has a one-way check valve 164 (such as a ball check valve or a diaphragm valve) connected thereto and disposed so as to allow air to enter the support layer 122 when the check valve 164 opens. The one-way check valve 164 may be configured so that when a vacuum is created in the sealed cover (such as may be created when no support force is placed on the face pack, or when a support force is lifted from the face pack) air may be drawn into the support layer through the check valve. The support layer may include a pressure relief valve 146 at an outlet 148 of the support layer which can be selected or set to a specific relief pressure. As described in the previous embodiment, by using a foam with light compression force, the patients head will then be supported by the air at the prescribed pressure.

Further Embodiments

In some embodiments, a patient may be supported with approximately uniform pressure across the surface of the face. For example, in the embodiment shown in FIG. 6, the pressure provided across the surface of the patient's face may be approximately uniform. The pressure may be set and/or user selected within a pressure range. For example, the upper pressure limit may be the head pressure of the pump and the lower may be based on the reforming force of the encased foam. The supplied pressure of the embodiment may help to ensure that the pressure within the sealed support cover is always at the set check valve pressure, with the exception of small transient fluctuations.

In some embodiments, a face pack may comprise of only the MVTR layer 120 (i.e., no support layer). In some of those embodiments, the boundary layer 134 may prevent air and moisture vapor from escaping, with moisture-saturated air being directed away from the patient and expelled from the MVTR layer 120 using a vent 143 or other suitable expulsion means. The MVTR layer 120 may, for example, be configured to both support the head of the patient, collect moisture vapor and route moisture vapor to the vent 143.

In some embodiments, a support structure and air pocket could be eliminated and only an air bladder, with an MVTR interface layer and similar mechanism of action could be used. In some embodiments, the spacer layer and boundary layer could be eliminated, and air could be pushed directly into the support layer. In other words, the MVTR layer and support layer could be combined into a single layer that provides both MVTR and head support. In some embodiments, the support layer may comprise only an inflatable chamber without any internal foam or other support structure. In such embodiments, the support layer, only pressurized air inflating the chamber may provide support.

In some embodiments, a pressure relief valve 146 could be replaced with an orifice sized or adjusted to maintain a desired bladder pressure. For example, in the embodiment shown in FIG. 6, pressure relief valve 146 may be replaced with or used in combination with an orifice. The orifice may be sized to work with the air pump 116 so that a desired pressure is maintained within the support layer 122. In some embodiments, a pressure relief valve 146 may comprise an active electronically controlled pressure sensor and relief valve. This may, for example, be used to adjust a pressure setting so as to optimize support for individual patients. Still in a further variation of this embodiment, a valve 172 (such as an electromechanically controlled valve as further described in relation to FIG. 10) may be configured to operate in a pulsed, cyclical, pseudo-random, or other manner so that pressure within the support layer 122 may be varied over time. For example, in the embodiment shown in FIG. 6, a valve 172 may be substituted for the relief valve 146, and the valve 172 may be configured to periodically vent. For example, the valve 172 may operate under the control of a timing circuit so that pressure is periodically released.

Periodic controlled venting or pressure cycling may help to provide effective removal of moisture vapor from the spacer layer 122 while helping to ensure patient comfort. Venting may, for example, be characterized by a frequency of venting and a time in which the valve may be open. During periods between venting, the air pressure in the support layer 122 and spacer layer 132 may stabilize to a relatively constant level set to an ideal range for comfortably supporting the patient. For example, pressure in the layers 122, 132 may help to distribute force so as to reduce localized areas of high pressure on the face. During venting, moisture vapor may be removed so as to lower the vapor pressure of water in the spacer layer 132 thereby maintaining a required gradient of water partial pressures on either side of the interface layer 130 to ensure moisture removal. In some embodiments, the air mover or an inlet valve may be periodically cycled to stop air flow through the MVTR layer. The MVTR layer may thus deflate so that the head is supported more by the support layer, thus changing the support pressure points on the face. For example, pressure across the face may be more broadly distributed by the MVTR layer, but focused more on the forehead and bony protuberances of the face by the support layer. By alternating between supporting the face by the MVTR layer and supporting the face by the support layer, pressure points across the face may be changed periodically. Even with no air flow through the MVTR layer, drier air remaining in the MVTR layer will still tend to draw moisture vapor through the facial interface. After a suitable duration, such as a minute or two, the air mover or inlet valve may be cycled to force air through the MVTR layer, thereby re-inflating the MVTR layer and shifting the facial pressure points.

In some embodiments, venting may be selected or controlled to ensure that a proper gradient of moisture is maintained across the facial interface layer 130. For example, in some embodiments, air within the spacer layer 132 may generally be maintained so that it maintains a humidity that is about the same as the ambient environment. This may, for example, be controlled by selecting an optimum frequency of venting. However, pressure cycling may also be controlled so as to minimize disruption of pressure during venting. For example, in some embodiments, during venting, the valve 172 may only be opened for a period of time suitable so that the pressure in one or more of the layers 122, 132 does not drop below a certain pressure. That is, the time of venting may be controlled so as to minimize variation of pressure in one or more of the layers 122, 132 to help maintain proper support of the patient's head. For example, in some embodiments, the valve 172 may release pressure once within a time period of about 1 minute to about 60 minutes, or at some other suitable interval to balance between changing pressure and suitable moisture vapor venting. Thus, the valve 172 may be used in place of the valve 146 or used in combination with the valve 146 to provide for pressure cycling. Thus, the embodiment shown in FIG. 6, may, for example, be used to provide for controlled pressure cycling similarly to the embodiments described below in relation to FIG. 10.

In some embodiments, multiple support bladders could be linked in series or parallel and multiple pressure relief and check valves could be incorporated to allow for different pressures in the bladders. Multiple pressure relief valves may be used to achieve proper flow and pressure in such a structure including multiple support bladders. For example, a first group of bladders may be positioned so that they significantly respond to venting when a first relief valve is activated. A second group of bladders may be positioned so that they significantly respond to venting when a second relief valve is activated. For example, in the embodiment shown in FIG. 6, multiple support bladders could be arranged so that different pressures may be maintained across different regions of the head pack shown therein. Bladders in different regions of the support structure 122 could be filled or vented by coordinated control of multiple pressure relief and check valves so as to provide a desired pressure to a head pack or to provide for pressure cycling. In some embodiments, multiple bladders of a support structure 122 may be arranged so that they respond at different rates to pressure changes (e.g., applied pressure from the air pump 116 or vented pressure initiated using the valves 146, 172). This arrangement could be used with multiple valves disposed at different locations or even using a single venting port. For example, pulsed venting using a pulsating valve 172 could initiate pressure variation in the different bladders based on different rates of fluid communication between the different bladders and the valve 172. Thus, a pressure within a support layer 122 could be varied across different regions of a head pack using various combinations of one or more valves 146, 172. Thus, the embodiment shown in FIG. 6, may, for example, be used to provide for controlled pressure cycling over different regions of a head pack as similarly described for the embodiment shown in FIG. 11.

Figure 10:
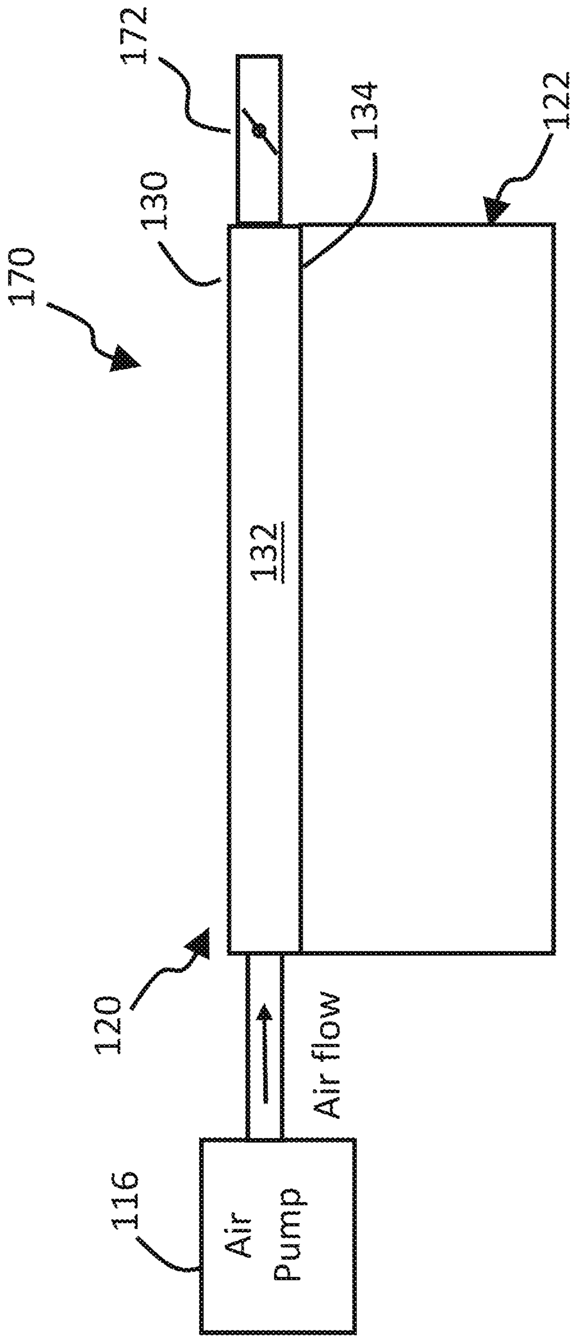
FIG. 10 illustrates another embodiment of a face pack including a valve.

In some embodiments, air pressure provided to one or more support bladders may be controlled by providing air pressure or relieving pressure (e.g., using one or more valves) in a time dependent manner or pulsed manner. For example, as shown in FIG. 10, a face pack 170 may include one or more valves designed to selectively open or close so as to vary the pressure in the MVTR layer 120. In this embodiment, the MVTR layer 120 may maintain sufficient pressure to help support the patient's face. For example, the MVTR layer 120 may comprise one or more bladders that work with the support layer 122 to help to support the patient. Alternatively, the MVTR layer 120 and support layer 122 could be combined into a single layer that provides both MVTR and full head support. As shown in FIG. 10, the MVTR layer 120 may be connected to a valve 172. The valve 172 may, for example, be disposed at an outlet region of the MVTR layer 120 positioned at a distal end away from the air pump 116. Alternatively, more than one valve 172 may be used, including, for example, wherein selective venting of different bladders among a plurality of bladders is used.

In one mode of operation, the face pack 170 may be used for removal of moisture vapor 142 while maintaining a minimal pressure in the MVTR layer 120. For example, the valve 172 could be maintained in a closed position so that the pressure of the face pack 170 remains about constant after the MVTR layer is filled. Alternatively, the valve 172 may be operated in a mode wherein the valve periodically opens so as to temporarily relieve pressure from the MVTR layer 120 and/or allow for removal of moisture as described above. For example, the valve 172 may operate under the control of a timing circuit so that pressure applied to the patient's face is periodically reduced and water vapor removed. Venting from the valve 172 may, for example, provide for an about uniform decrease in pressure across the face pack 170. Pressure within the MVTR layer 120 may then increase as air is provided from the air pump 116, so that the pressure varies in a cyclic manner.

Figure 11:
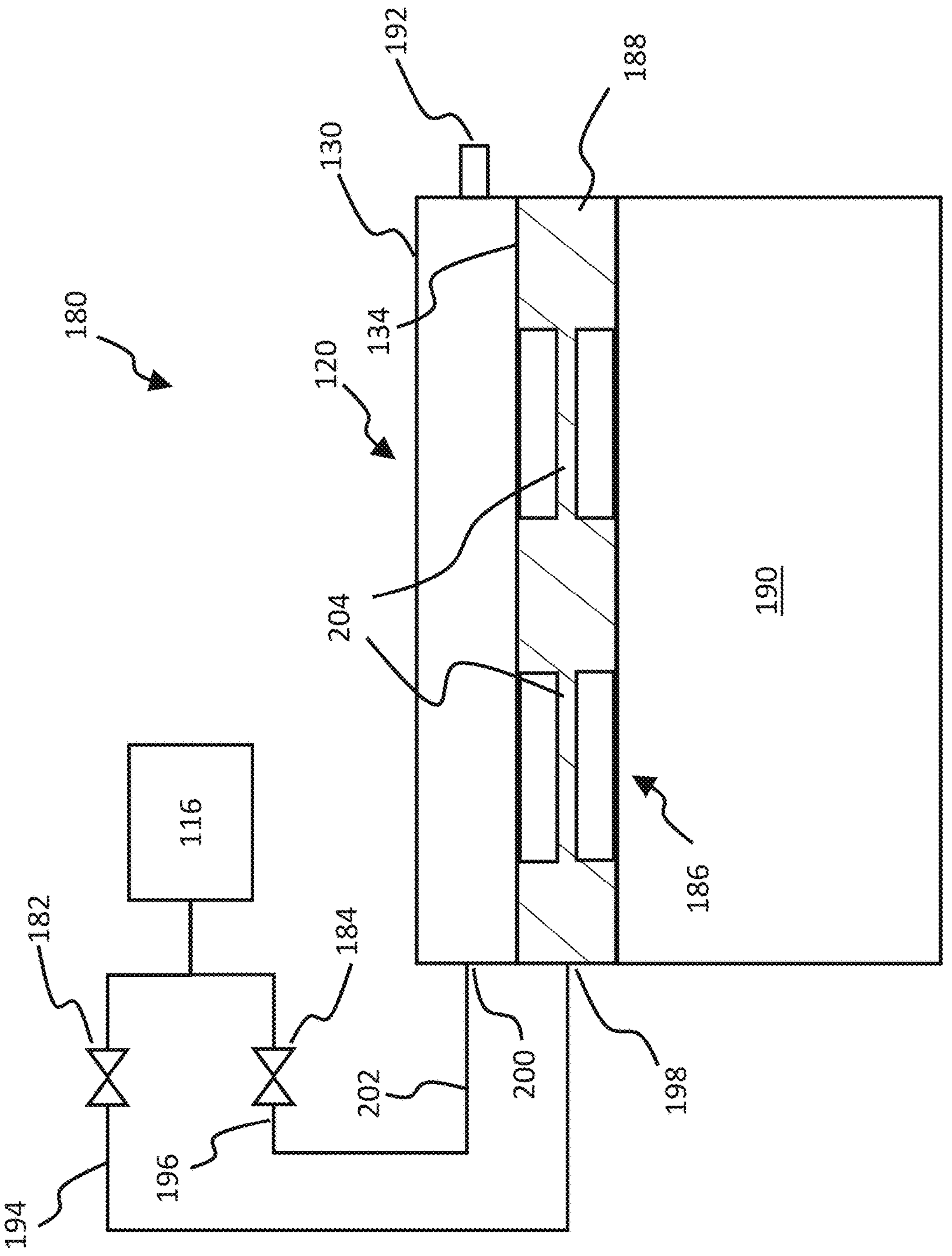
FIG. 11 illustrates another embodiment of a face pack.

As shown in FIG. 11, a face pack 180 may include an MVTR layer 120 including a facial interface layer 130 and a boundary layer 134. The MVTR layer 120 may receive fluid from air mover 116 (e.g., an air pump) through an inlet 200 connected to the fluid conduit 202. A valve 184 may control flow of fluid from the air mover 116 to the MVTR layer 120. The face pack 180 may further include a pressure support layer 186. Pressure support layer 186 may, for example, comprise a bladder 188 with multiple pneumatically connected chambers. Pneumatic connections 204 between the chambers allow air to pass therebetween. Pressurization of the connected chambers may be used to create spatial variation of pressure within the support layer 186. The pressure can be varied over time to such as by providing pneumatic pulses to the bladder 188 so as to offload pressure from different regions of the patient's face. In some embodiments, more than one bladder 188 may be used. With multiple bladders, the support layer 186 may provide different regions that are alternatively pressured. The pressure support layer 186 may be in fluid communication with the air pump 116 through an inlet 198 connected to the flow conduit 194. A valve 182 may control flow from the air pump 116 to the pressure support layer 186.

In some embodiments, the face packs herein have a distinct advantage over fully pneumatic bladders (no reforming foam) in that if pneumatic pressure is lost, the patient's head may still be supported by the support layer 122 (e.g., by foam inside the sealed support cover). For example, each of the embodiments shown in FIGS. 6, 9, 10, and 11 may include a support layer 122 to support the patient even in the absence of air pressure.

In further embodiments, a head pack as disclosed herein may be used for manual prone therapy. A patient turned face-down on a plain bed or other non-rotating patient support surface may be supported at the face by an MVTR face pack as disclosed herein. Thus, the disclosed face packs may be used for automated and manual proning. In some embodiments, packs as described herein could be used for a patient lying on their side. In those embodiments, cut outs may be provided for the patient's ears so that the patient is supported by other areas of the side of the patient's head.

It is an objective of some embodiments herein to provide a head pack that protects a patient's skin from breakdown. The head pack may, for example, include means to help control the moisture surrounding the patient at a controlled level, means to help reduce shear force on the patient's skin or both. In some embodiments, a head pack may comprise a foam support of graduated initial force deflection, an active moisture vapor removal system, or a combination of both. Use of a support of graduated initial force deflection may help to reduce pressure on the face and reduce skin breakdown. Use of an active moisture removal system may help to control friction between the skin and the surface of the head pack so as to help reduce skin breakdown.

It is an objective of some embodiments herein to provide a head pack that protects a patient's skin from breakdown by positively impacting various aspects of face packs and surrounding skin, including, for example, skin interface pressure, moisture, shear force, temperature, and combinations thereof. For example, interface pressure may be positively impacted by maximizing a surface area of contact area with the face pack while still allowing for visibility of the patient's eyes and maintaining adequate room for oral intubation lines. The pressure may be further managed through use of graduated density foam layers, which may allow for increased immersion and greater contact area.

It is an objective of some embodiments herein to provide a method for making a face pack. For example, in some embodiments, an interfacial layer for a head pack may be bonded to an adjacent boundary layer using a welding process such as may exclude use of an external adhesive or external sealing tape. For example, in some embodiments, a heat transfer vinyl may be used to seal two or more layers of a head pack together.

It is an objective of some embodiments herein to provide a support system for holding a patient face when suspended in a prone position or otherwise when rotating a patient over some angular range.

Although the foregoing specific details describe various embodiments, persons of ordinary skill in the art will recognize that various changes may be made in the details of the disclosed subject matter without departing from the spirit and scope of the invention as defined in the appended claims and other claims that may be drawn to this invention and considering the doctrine of equivalents. Among other things, any feature described for one embodiment may be used in any other embodiment, and any feature described herein may be used independently or in combination with other features. Also, unless the context indicates otherwise, it should be understood that when a component is described herein as being mounted or connected to another component, such mounting or connection may be direct with no intermediate components or indirect with one or more intermediate components. Therefore, it should be understood that the disclosed subject matter is not to be limited to the specific details shown and described herein.

What is claimed is:

1. A proning face pack comprising:

a moisture vapor removal layer configured for maximizing interface with the forehead and checks of a patient face, the moisture vapor removal layer configured to transmit moisture away from the patient face in the vapor phase while being impermeable to air and liquid phase water, the moisture vapor removal layer further shaped to conform to the outer dimensions of a patient's face, the moisture vapor removal layer further shaped to contour the patient's forehead and cheeks so as to form one or more openings for the eyes, mouth and nose of a patient's face;

an air mover pneumatically coupled to the moisture vapor removal layer to move air through the moisture vapor removal layer;

a support layer disposed adjacent the moisture vapor removal layer.

2. The head pack of claim 1 further comprising an air mover pneumatically coupled to the moisture vapor removal layer to push air into the moisture vapor removal layer; the support layer being pneumatically coupled to the moisture vapor removal layer so as to receive air from the moisture vapor removal layer, the support layer further comprising a vent disposed so as to pass air from the support layer to atmosphere.

3. The head pack of claim 2, the support layer further comprising a pressure relief valve coupled to the vent, the pressure relief valve configured to open at a set pressure point.

4. The head pack of claim 3, the pressure relief valve configured to permit air flow at a rate approximately equal to or lesser than a flow rate supplied by the air mover.

5. The head pack of claim 1, the moisture vapor removal layer being sealed along its perimeter to the support layer, the moisture vapor removal layer being separated from the support layer by an air impermeable boundary layer.

6. The head pack of claim 1, the support layer including a reforming foam, the support layer comprising a valve disposed so as to allow air flow into the support layer from atmosphere, the valve configured to open when the support layer is not supporting a patient face.

7. The head pack of claim 6, the moisture vapor removal layer comprising a vent disposed so as to vent moisture vapor to atmosphere.

8. The head pack of claim 6, the support layer further comprising a pressure relief valve configured to release air from the support layer at a predetermined pressure set point.

9. A proning face pack comprising:

a moisture vapor removal layer configured for maximizing interface with the forehead and cheeks of the face patient's face, the moisture vapor removal layer configured to transmit moisture away from the patient's face as vapor while being impermeable to air and liquid phase water, the moisture vapor removal layer being shaped to conform to the outer dimensions of a patient's face, the moisture vapor removal layer further shaped to contour the patient's forehead and cheeks so as to form one or more openings for the eyes, mouth and nose of a patient's face and further configured to receive fluid pressure from a fluid pressure source so as to provide support to the patient when using the face pack;

a vent disposed so as to vent moisture vapor from the moisture vapor removal layer to atmosphere; and a valve configured to pulse open so as to provide cyclical variation of pressure within the moisture vapor removal layer.

10. The head pack of claim 9 wherein said cyclical variation of pressure includes opening the valve at a frequency or for a period of time so as to maintain a suitable level of moisture vapor within the MVTR layer to encourage removal of moisture from the patient.

11. The head pack of claim 9 wherein said cyclical variation of pressure includes opening the valve at a frequency or for a period of time so that an air pressure in the moisture vapor removal layer does not decrease below a threshold level.

12. The head pack of claim 9 further comprising a support layer, including a material to help support the patient even if pressure is lost from the head pack.

13. The head pack of claim 9 further comprising a support layer, one or more openings made in the moisture vapor removal layer so as to allow moisture vapor to enter into said support layer.

14. The head pack of claim 9, said moisture vapor removal layer comprising:

a facial interface layer configured to interface with the patient's face, the facial interface layer being liquid vapor permeable but liquid and air impermeable;

a boundary layer being air impermeable; and a spacer layer disposed between the interface layer and the boundary layer, the spacer layer configured to allow air flow therethrough.

* * * * *